(12) United States Patent
Chan et al.

(10) Patent No.: US 8,098,437 B2
(45) Date of Patent: Jan. 17, 2012

(54) LENS DEVICE HAVING PROTECTIVE ELEMENTS

(75) Inventors: Seng-Kum Chan, Santa Clara, CA (US); David J. K. Meadowcroft, San Jose, CA (US); Paul Yu, Mountain View, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/819,879

(22) Filed: Jun. 21, 2010

(65) Prior Publication Data

US 2011/0310490 A1    Dec. 22, 2011

(51) Int. Cl.
*G02B 27/10*    (2006.01)
*G03B 21/60*    (2006.01)
(52) U.S. Cl. ....................... 359/619; 359/455
(58) Field of Classification Search .......... 359/618–621, 359/626, 443, 454–455; 264/1.1, 1.32, 2.7
See application file for complete search history.

(56) References Cited

U.S. PATENT DOCUMENTS

| 6,729,721 | B1 | 5/2004 | Zamora | |
|---|---|---|---|---|
| 6,912,090 | B2* | 6/2005 | Kornblit et al. | 359/619 |
| 7,631,321 | B2 | 12/2009 | Hayashi et al. | |
| 2001/0028506 | A1* | 10/2001 | Fujimoto et al. | 359/622 |
| 2002/0109925 | A1 | 8/2002 | Miura | |
| 2005/0141104 | A1* | 6/2005 | Hong | 359/727 |
| 2006/0146684 | A1 | 7/2006 | Pool | |
| 2008/0080068 | A1* | 4/2008 | Maeno | 359/811 |
| 2009/0185287 | A1* | 7/2009 | Sowa et al. | 359/708 |
| 2010/0142061 | A1* | 6/2010 | Choi et al. | 359/793 |

FOREIGN PATENT DOCUMENTS

JP    2000109158 A    4/2000

* cited by examiner

*Primary Examiner* — Dawayne Pinkney

(57) ABSTRACT

A lens device has a body with a base surface, a plurality of lenses on the base surface, and a plurality of projections extending above the base surface and defining a protective plane above the plurality of lenses. The plurality of projections can include, for example, post-like regions, ridge-like regions, or a combination thereof.

8 Claims, 5 Drawing Sheets

LENS DEVICE HAVING PROTECTIVE ELEMENTS

BACKGROUND

In an optical communication system, it is generally necessary to couple an optical fiber to an opto-electronic transmitter, receiver or transceiver device and, in turn, to couple the device to an electronic system such as a switching system or processing system. These connections can be facilitated by modularizing the transceiver device. An opto-electronic transceiver module includes an opto-electronic light source, such as a laser, and an opto-electronic light receiver, such as a photodiode, and may also include various electronic circuitry associated with the laser and photodiode. For example, driver circuitry can be included for driving the laser in response to electronic signals received from the electronic system. Likewise, receiver circuitry can be included for processing the signals produced by the photodiode and providing output signals to the electronic system. An opto-electronic transceiver module also commonly includes optics such as a lens for focusing light emitted from the end of an optical fiber upon the photodiode and a lens for collimating light emitted by the laser into an end of an optical fiber. Some opto-electronic transceiver modules provide a number of parallel optical transmit and receive channels by including a number of light sources, light receivers, lenses and associated electronic circuitry.

Lens devices that include an array of lenses can be used in opto-electronic transceiver modules having multiple parallel optical transmit and receive channels. Such a lens device can be made of molded thermoplastic and have a number of lenses unitarily molded into the plastic body along with features that aid mounting the lens device in a transceiver module. Such a lens device can be economically manufactured in bulk quantities. In the manufacturing process, lens devices are released from molds and, at some point during the manufacturing process, dropped onto a table or conveyer belt for inspection, further processing, packaging or other purposes. For quality control purposes, human inspectors can look through magnifiers at lens devices scattered about on the inspection table and pick out any defective lens devices. Lens devices that pass such inspection are commonly stored in bulk bins or bags for further processing or packaging. In some instances, automated machine-vision inspection systems can aid such quality control inspection. Lens devices that are manufactured to be inspected by such automated machine-vision inspection systems can include fiducial markings to aid recognition by such inspection systems.

A common problem during the bulk manufacture, storage and handling of such lens devices is that some of the lenses become scratched or otherwise optically impaired as a result of rubbing against surfaces on a table, in a storage bin, etc. It would be desirable to minimize the likelihood of such damage.

SUMMARY

Embodiments of the present invention relate to a lens device having a body with a base surface, a plurality of lenses on the base surface, and a plurality of projections extending above the base surface and defining a protective plane above the plurality of lenses. The plurality of projections can include, for example, post-like regions, ridge-like regions, or a combination thereof. In some embodiments, ridge-like projection regions can form a perimeter that surrounds the lenses. The projections can have flat surfaces that, depending upon their collective flat area in relation to the area occupied by the lenses in a given embodiment, can provide an effect of the lenses being recessed into a surface of the lens device body.

In a manufacturing or similar environment in which a multiplicity of such lens devices are handled on a work surface, the plurality of projections can support the lenses above the work surface to protect the lenses against contact with the work surface that could result in scratching or similar damage to the lenses.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
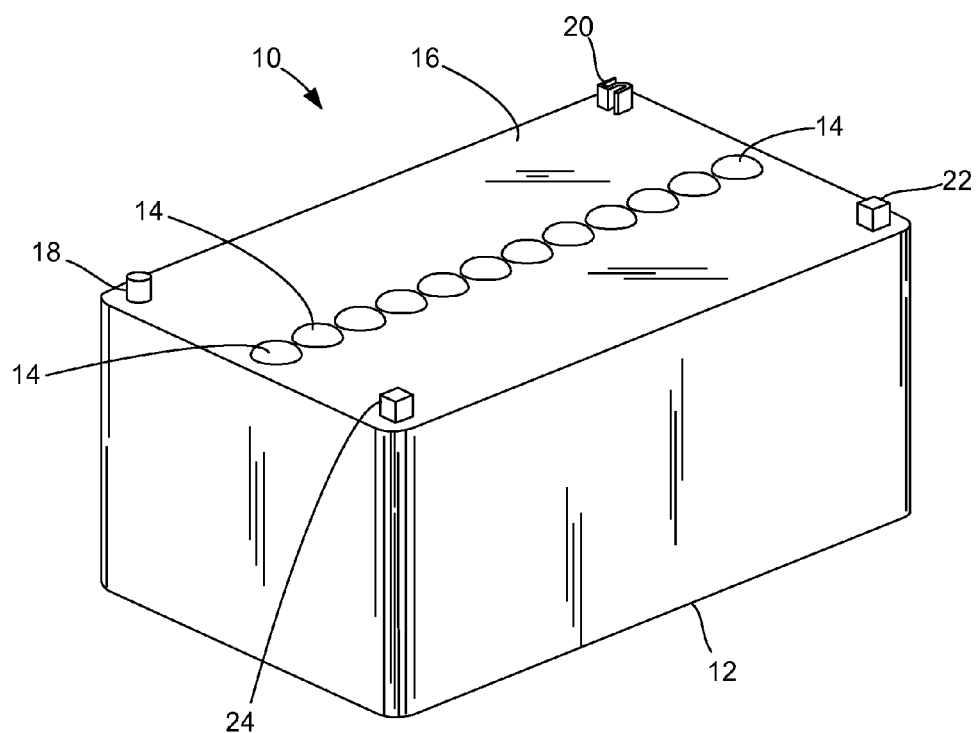
FIG. 1 is a perspective view of a lens device, in accordance with an exemplary embodiment of the invention.
Figure 2:
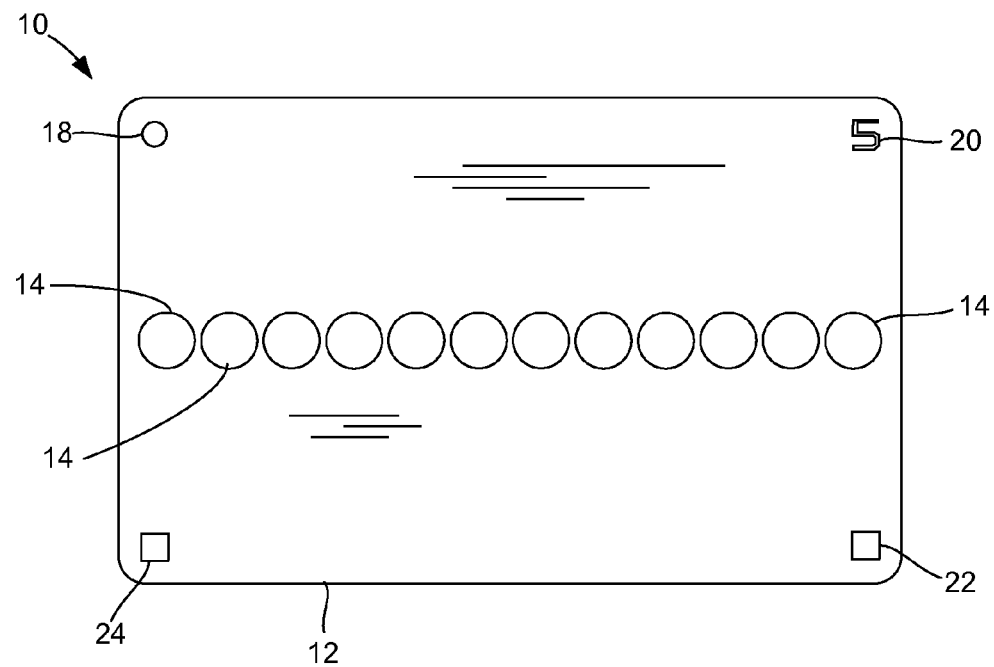
FIG. 2 is a top plan view of the lens device of FIG. 1.
Figure 3:
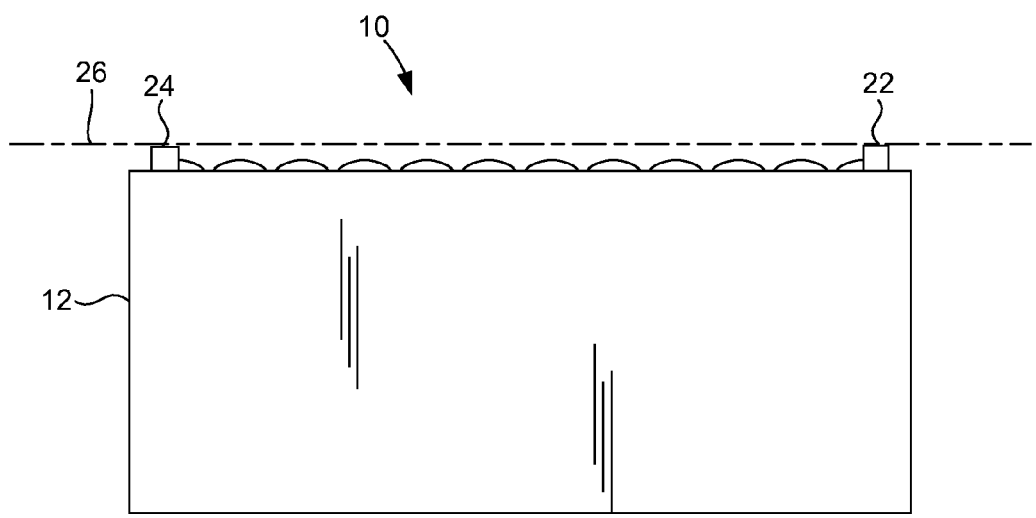
FIG. 3 is a side elevation view of the lens device of FIG. 1.

As illustrated in FIGS. 1-3, in an illustrative or exemplary embodiment of the invention, a lens device 10 comprises a body 12, a plurality of lenses 14 formed on a base surface 16 of body 12, and a plurality of projections 18, 20, 22 and 24 that extend above base surface 16 and lenses 14. Body 12, lenses 14, and projections 18, 20, 22 and 24 can be unitarily formed together. For example, lens device 10 can be made of a single piece of suitable material, such as a moldable thermoplastic, in which body 12, lenses 14, and projections 18, 20, 22 and 24 correspond to features of the mold in which lens device 10 is formed. A suitable moldable thermoplastic is, for example, ULTEM® polyetherimide from SABIC (formerly General Electric Plastics Division). A polycarbonate is another example of a plastic material that may be suitable. The material is transparent to the wavelengths of light intended to be transmitted through lenses 14 during use of lens device 10. Although not shown in FIG. 1, during use of lens device 10 the light can pass through body 12, i.e., between one of lenses 14 and the face or surface of body 12 opposite base surface 16, as well understood in the art. Also, although in the embodiment illustrated in FIGS. 1-3 body 12 has a rectangular, box-like shape, in other embodiments a lens device body can have any other suitable shape. Similarly, although in the embodiment illustrated in FIGS. 1-3 base surface 16 and other walls or surfaces of body 12 are flat or planar, in other embodiments such surfaces can have any other suitable shapes or contours.

In the embodiment illustrated in FIGS. 1-3, each of projections 18, 20, 22 and 24 comprises a post-like structure or region, referred to herein for brevity as a "post region," which rises above or extends above base surface 16 and lenses 14. Some or all of projections 18, 20, 22 and 24 can have different shapes or other characteristics from the others. The plurality of projections 18, 20, 22 and 24 collectively define a protective plane 26 (FIG. 3) above lenses 14. That is, projections 18, 20, 22 and 24 extend above base surface 16 and lenses 14 to provide a means for protecting lenses 14 in a manner described in further detail below. More specifically, the distal end of each of projections 18, 20, 22 and 24 lies in protective plane 26. Although in the embodiment illustrated in FIGS. 1-3 there are four projections 18, 20, 22 and 24 that are located at the corners of a rectangular base surface 16, in other embodiments there can be more projections or fewer projections, at any suitable locations on a lens device body. As a plane can be defined geometrically by at least three points, any three post regions or similar post-like projections that extend above the base surface and lenses in such other embodiments can define a protective plane for those lenses.

Figure 4:
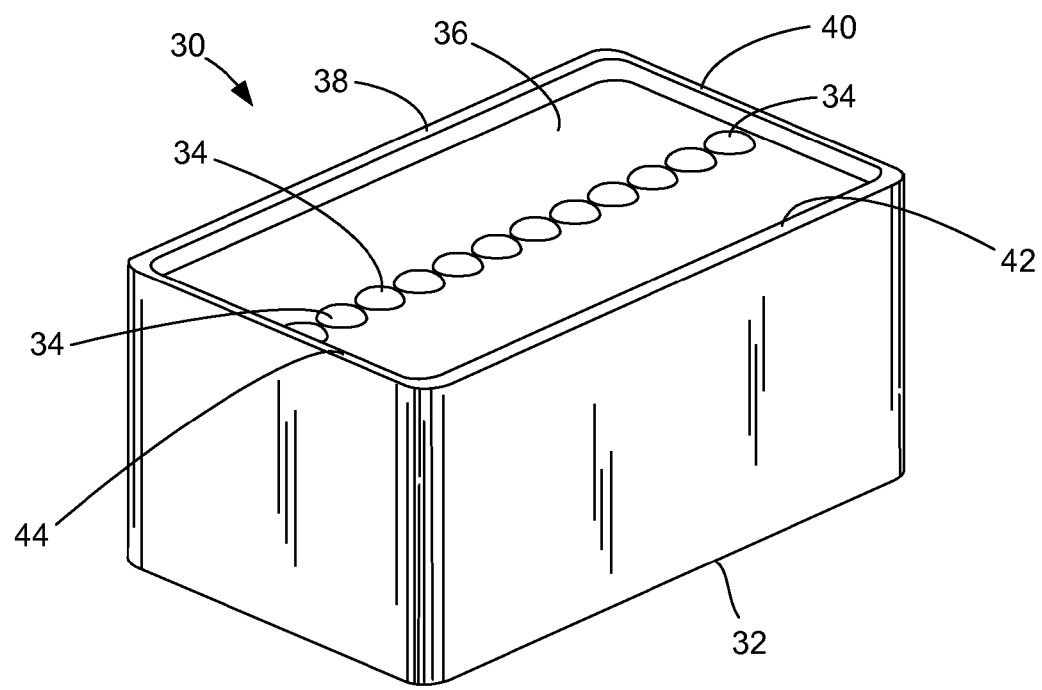
FIG. 4 is a perspective view of another lens device, in accordance with another exemplary embodiment of the invention.
Figure 5:
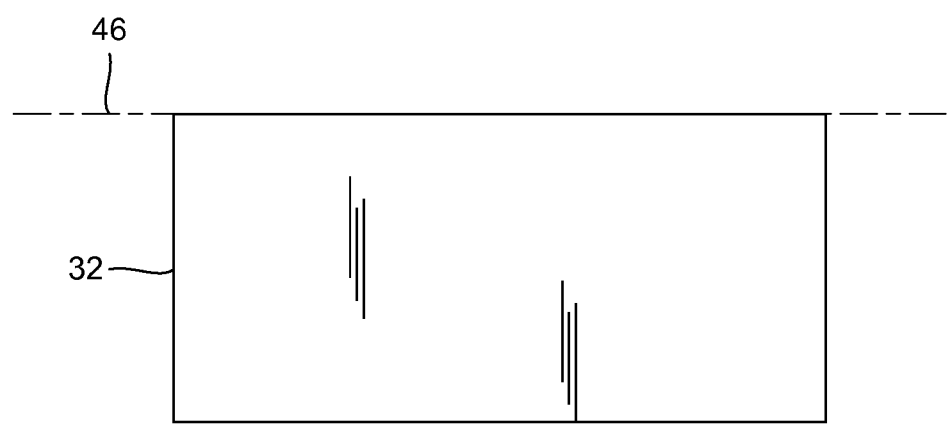
FIG. 5 is a side elevation view of the lens device of FIG. 4.

As illustrated in FIGS. 4-5, in another exemplary embodiment of the invention, a lens device 30 comprises a body 32, a plurality of lenses 34 formed on a base surface 36 of body 32, and a plurality of projections 38, 40, 42 and 44 that extend above base surface 36 and lenses 34. Body 32, lenses 34, and projections 38, 40, 42 and 44 can be unitarily formed together in the same manner as that described above with regard to the embodiment illustrated in FIGS. 1-3. As in the embodiment illustrated in FIGS. 1-3, lenses 34 can be located at any suitable locations on body 32, and body 32 and its surfaces can have any suitable shapes or contours.

In the embodiment illustrated in FIGS. 4-5, each of projections 38, 40, 42 and 44 comprises a ridge-like structure or region, referred to herein for brevity as a "ridge region," which rises above or extends above base surface 36 and lenses 34. In this embodiment, projections 38, 40, 42 and 44 collectively define a ridge-like perimeter or wall that surrounds lenses 34, with each of projections 38, 40, 42 and 44 being co-extensive with a portion of one of the walls or surfaces of body 32. As in the embodiment described above with regard to FIGS. 1-3, the plurality of projections 38, 40, 42 and 44 collectively define a protective plane 46 (FIG. 5) above lenses 34. That is, projections 38, 40, 42 and 44 extend above base surface 36 and lenses 34 to provide a means for protecting lenses 34 in a manner described in further detail below. More specifically, the distal edge of each of projections 38, 40, 42 and 44 lies in protective plane 46. Although in the embodiment illustrated in FIGS. 4-5 there are four projections 38, 40, 42 and 44 that are co-extensive with four walls or surfaces of body 32, in other embodiments there can be more projections or fewer projections, at any other suitable locations on such a body. As a plane can be defined geometrically by at least two lines, any two ridge regions or similar ridge-like projections that extend above the base surface and lenses in such other embodiments can define a protective plane for those lenses.

Figure 6:
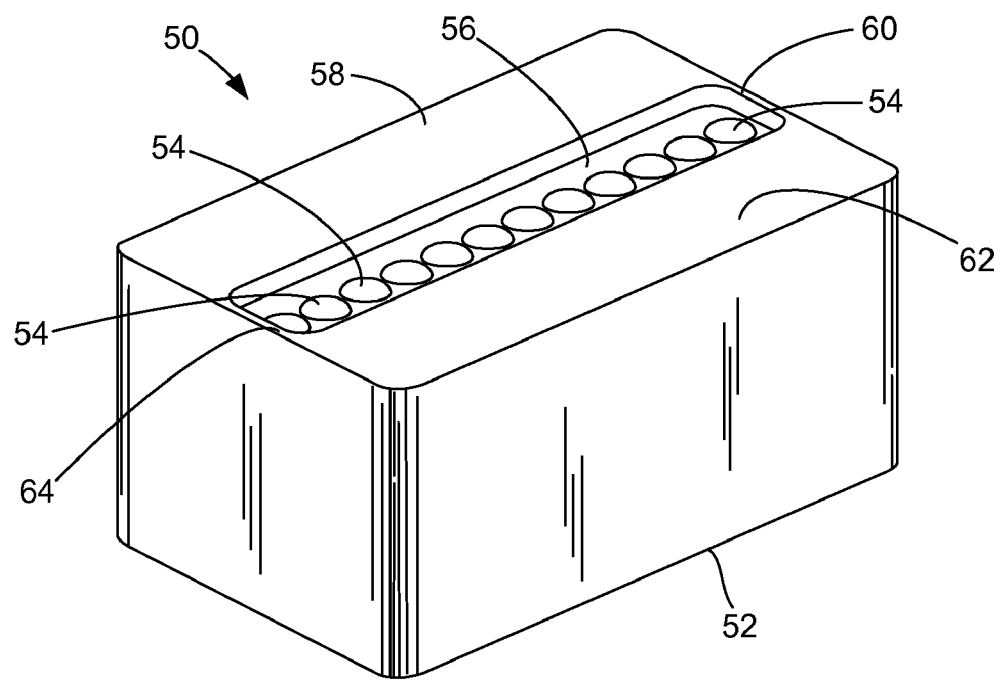
FIG. 6 is a perspective view of still another lens device, in accordance with still another exemplary embodiment of the invention.
Figure 7:
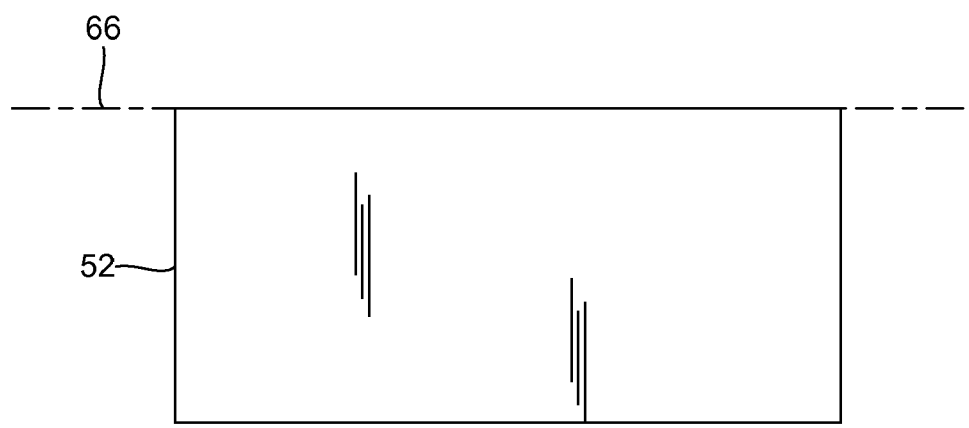
FIG. 7 is a side elevation view of the lens device of FIG. 6.

As illustrated in FIGS. 6-7, in still another exemplary embodiment of the invention, a lens device 50 comprises a body 52, a plurality of lenses 54 formed on a base surface 56 of body 52, and a plurality of projections 58, 60, 62 and 64 that extend above base surface 56 and lenses 54. Body 52, lenses 54, and projections 58, 60, 62 and 64 can be unitarily formed together in the same manner as that described above with regard to the embodiments illustrated in FIGS. 1-5. As in the embodiments illustrated in FIGS. 1-5, lenses 54 can be located at any suitable locations on body 52, and body 52 and its constituent surfaces can have any suitable shapes or contours.

In the embodiment illustrated in FIGS. 6-7, each of projections 58, 60, 62 and 64 comprises a ridge region that rises above or extends above base surface 56 and lenses 54. As in the embodiment illustrated in FIGS. 4-5, projections 58, 60, 62 and 64 collectively define a ridge-like perimeter or wall that surrounds lenses 54. Projections 60 and 64 are similar to projections 40 and 44 in the embodiment illustrated in FIGS. 4-5. However, projections 58 and 62 are broader than those of the embodiment illustrated in FIGS. 4-5, defining ridge regions that are substantially flat or plateau-like surfaces. Due to the relatively broad, substantially flat or plateau-like surfaces defined by projections 58 and 62, the combined surface area of projections 58, 60, 62 and 64 can be, for example, more than twice the area occupied by lenses 54. Note that the perception of whether a ridge region is narrow or broad in a given embodiment depends upon the area occupied by the ridge region in relation to the area occupied by the lenses or base surface. In the embodiment illustrated in FIGS. 6-7, the collective area occupied by projections 58, 60, 62 and 64 is much greater than (e.g., at least twice as great as) the collective area occupied by lenses 54. In contrast, in the embodiment illustrated in FIGS. 4-5, the collective area occupied by projections 38, 40, 42 and 44 is not very much greater, if at all, than the collective area occupied by lenses 34. In the embodiment illustrated in FIGS. 4-5 projections 38, 40, 42 and 44 can be perceived as extending above lenses 34 because projections 38, 40, 42 and 44 define narrow ridge regions, while in the embodiment illustrated in FIGS. 6-7 lenses 54 can be perceived as being recessed into body 12 because projections 58 and 62 define broad ridge regions. Nevertheless, in each of these embodiments the respective plurality of projections extends above the base surface and lenses. Note that still other embodiments (not shown) can include still other combinations of broad and narrow ridge region projections, post region projections, or projections having any other suitable shapes or contours.

As in the other embodiments described herein, the plurality of projections 58, 60, 62 and 64 collectively define a protective plane 66 (FIG. 7) above lenses 54. That is, projections 58, 60, 62 and 64 extend above base surface 56 and lenses 54 to provide a means for protecting lenses 54 in a manner described in further detail below. More specifically, the flat or plateau-like surface of each of projections 58 and 62 lies in protective plane 66. Although in this embodiment projections 58, 60, 62 and 64 are co-planar with each other and all lie in protective plane 66, in other embodiments there can be as few as one projection that defines a flat or plateau-like surface that extends above the lenses and base surface.

Figure 8:
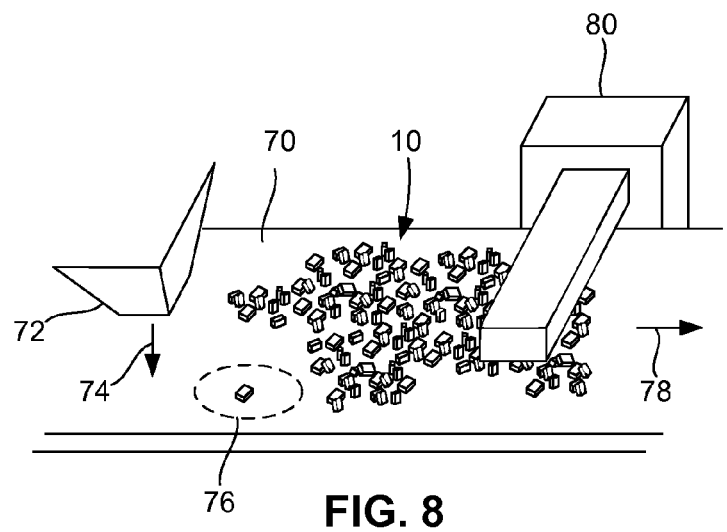
FIG. 8 illustrates a method for handling lens devices, in accordance with an exemplary embodiment of the invention.

As illustrated in FIG. 8, a method for handling lens devices of the type described above (e.g., lens device 10) can include releasing a multiplicity of the lens devices 10 onto a work surface, such as a conveyer surface 70. For example, a manufacturing process that involves molding the lens devices as described above can result in temporary storage of the lens devices in a bulk hopper 72, from which many lens devices 10 can be poured or otherwise dropped onto conveyer surface 70, as indicated by the arrow 74. Although lens devices 10 are shown in FIG. 8 as dropped onto conveyer surface 70 in a somewhat haphazard manner for purposes of emphasis, the manufacturing process can include the release of lens devices 10 in any other suitable manner, such as one at a time.

Figure 9:
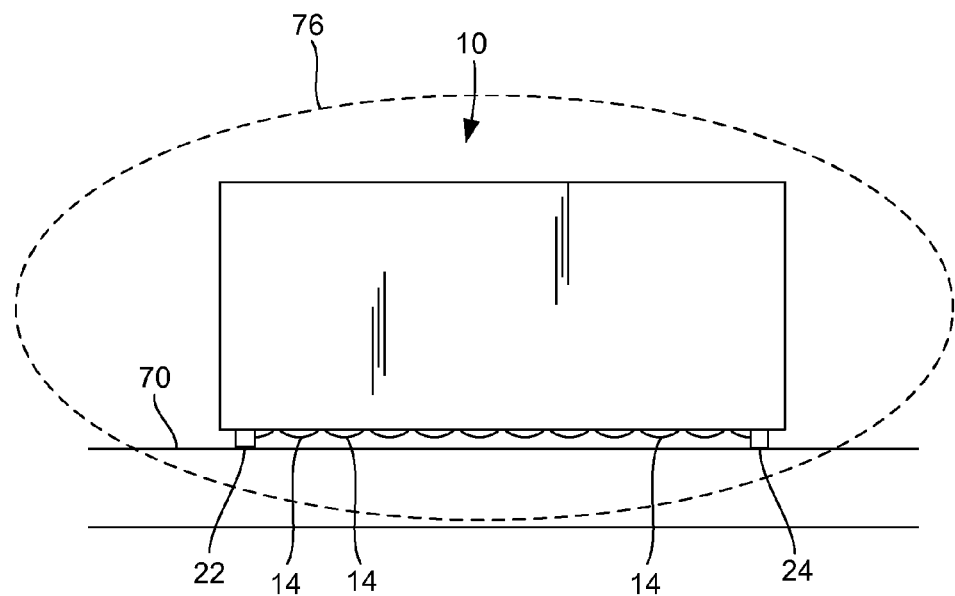
FIG. 9 is a side elevation view of one of the lens devices of FIG. 8 resting on a work surface in an orientation in which the lens device projections support the lenses of the lens device above the work surface and accordingly protect the lenses against contact with the work surface.

The orientation of a single one of lens devices 10, indicated by the dashed-line area 76 in FIG. 8, is shown in further detail in FIG. 9. After this lens device 10 is dropped onto conveyer surface 70, it comes to rest on conveyer surface 70 in an orientation in which projections 18, 20, 22 and 24 support lenses 14 above conveyer surface 10, thereby helping to protect lenses 14 against contact with conveyer surface 10. Note that in this orientation conveyer surface 70 is essentially co-planar with protective plane 26 (FIG. 3). That is, protective plane 26 defines a barrier that can prevent contact between a flat surface, such as conveyer surface 70, and regions below protective plane 26, such as the region in which lenses 14 are located. Contact between lenses 14 and a work surface or any other surface during handling of lens devices 10 is undesirable because it can scratch lenses 14 or otherwise impair the optical quality of lenses 14. Other lens devices 10 that are released onto conveyer surface 10 may randomly come to rest in other orientations, in which their lenses 14 are not adjacent conveyer surface 70 and thus not susceptible to damage. However, the invention can help protect those lens devices 10 that come to rest in an orientation in which their lenses 14 are adjacent conveyer surface 70 or other surface. Although conveyer surface 70 is illustrated as a work surface in this example, this method of handling lens devices can involve any other suitable work surface, such as a table, or other surface (e.g., a surface in a handling tool or machine).

Returning to FIG. 8, conveyer surface 70 can move lenses 10 in the direction of the arrow 78 beneath an automated machine-vision inspection system 80. Some or all of projections 18, 20, 22 and 24 can have different shapes or other characteristics from others to aid automated machine-vision inspection system 80 in performing an inspection of lenses 10. For example, as shown in FIG. 1, projection 18 can have a round profile, projection 20 can have an "S"-shaped profile, and projections 22 and 24 can have square profiles. Automated machine-vision inspection system 80 can recognize the different shapes and relative positions of, for example, projections 18, 20 and 22 (FIG. 1) and use the information to determine the orientation of lens device 10 with respect to conveyer surface 70. That is, the projections can serve as fiducial markings Such automated machine-vision inspection systems are well understood in the art and therefore not described herein in further detail. Although facilitating automated inspection is contemplated, projections having shapes that are distinguishable from one another by machine-vision systems or by humans can be used for other purposes, such as encoding a manufacturing date, lot number, mold cavity number, etc., for identification by such systems or persons.

One or more illustrative embodiments of the invention have been described above. However, it is to be understood that the invention is defined by the appended claims and is not limited to the specific embodiments described.

What is claimed is:

1. A lens device, comprising:
a body having a generally rectangular base surface;
a plurality of lenses disposed on the base surface; and
at least four post regions extending above the base surface and defining a protective plane above the plurality of lenses, one of the at least four post regions substantially located at each respective corner of the base surface, wherein the body, lenses and post regions are unitarily formed together, one of the four post regions located at one corner of the base surface having a shape that is different from a shape of another of the four post regions located at another corner of the base surface.

2. The lens device claimed in claim 1, wherein the body, lenses and plurality of projections are unitarily formed together of a molded plastic material.

3. The lens device claimed in claim 1, wherein each post region has a shape different from a shape of other post regions.

4. A lens device, comprising:
a body having a base surface;
a plurality of lenses located on the base surface; and
post-shaped protection means extending above the base surface for protecting the plurality of lenses, one of the post-shaped protection means located at one corner of the base surface having a shape that is different from a shape of another of the post-shaped protection means located at another corner of the base surface.

5. The lens device claimed in claim 4, wherein the body, lenses and post-shaped protection means are unitarily formed together.

6. The lens device claimed in claim 4, wherein the post-shaped protection means includes four post regions.

7. A method for handling lens devices, each lens device having a body with a base surface, a plurality of lenses on the base surface, and at least four post regions at respective corners of the base surface extending above the base surface and defining a protective plane, at least two of the four post regions having different shapes from each other, and the method comprising:
releasing a multiplicity of the lens devices onto a work surface, the at least four post regions of at least one lens device coming to rest on the work surface and supporting the plurality of lenses of the at least one lens device above the work surface and protecting the plurality of lenses of the at least one lens device against contact with the work surface; and
a machine vision inspection system determining an orientation of a lens device on the work surface by identifying the at least two post regions by their different shapes.

8. The method claimed in claim 7, wherein the body, lenses and the at least four post regions are unitarily formed together of a molded plastic material, and releasing a multiplicity of the lens devices onto a work surface comprises dropping a multiplicity of molded plastic lens devices onto the work surface.

* * * * *